(12) United States Patent
Beker

(10) Patent No.: US 8,773,787 B1
(45) Date of Patent: Jul. 8, 2014

(54) CHANGING THE PERFORMANCE LEVEL OF A DISK DRIVE

(75) Inventor: Orhan Beker, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 195 days.

(21) Appl. No.: 13/433,856

(22) Filed: Mar. 29, 2012

(51) Int. Cl.
*G11B 27/36* (2006.01)

(52) U.S. Cl.
USPC .......... 360/31; 360/77.04; 360/78.06; 706/13

(58) Field of Classification Search
CPC ........... G11B 5/5534; G11B 20/10009; G11B 5/012; G06F 11/3485; G06F 3/0607; G06F 3/0674
USPC ............... 360/31, 77.04, 78.04, 78.07, 77.02; 369/53.23; 706/13; 700/37, 41, 42, 45
See application file for complete search history.

(56) References Cited

U.S. PATENT DOCUMENTS

| | | | |
|---|---|---|---|
| 5,371,888 A * | 12/1994 | Lehnertz et al. | 718/100 |
| 5,880,902 A | 3/1999 | Yu et al. | |
| 6,320,714 B1 | 11/2001 | Moon et al. | |
| 6,373,649 B1 | 4/2002 | Walker et al. | |
| 6,446,156 B1 | 9/2002 | Chia et al. | |
| 6,499,022 B1 * | 12/2002 | Dittmar et al. | 706/13 |
| 6,754,036 B2 | 6/2004 | Dehnert | |
| 7,084,894 B2 * | 8/2006 | Van Brocklin et al. | 347/224 |
| 7,471,486 B1 | 12/2008 | Coker et al. | |

* cited by examiner

*Primary Examiner* — Ali Neyzari

(57) ABSTRACT

A method or apparatus for changing a performance level of a disk drive from an initial performance level to a target performance level, wherein the disk drive includes a profile table. The method including determining an initial performance level, determining a target performance level, determining constant offset values that cause the performance level of the disk drive to match the target performance level, and programming a constant offset table of the profile table with the constant offset values.

16 Claims, 5 Drawing Sheets

702 — INITIAL CONSTANT OFFSETS

```
         BINS = [1 2 3 4 5 6 7 8 9 10];
READ CONSTANT OFFSET = [2 2 2 2 2 2 2 2 2 2];
WRITE CONSTANT OFFSET = [8 8 8 8 8 8 8 8 8 8];
```

704 — INITIAL PERFORMANCE LEVEL

| QUEUE | 1 | 2 | 4 | 8 | 16 | 32 | 64 |
|---|---|---|---|---|---|---|---|
| RD | 84 | 99 | 117 | 138 | 166 | 194 | 229 |
| WR | 77 | 91 | 105 | 119 | 138 | 158 | 179 |

706, 708, 710

705 — DESIRED TARGET PERFORMANCE LEVEL

| QUEUE | 1 | 2 | 4 | 8 | 16 | 32 | 64 |
|---|---|---|---|---|---|---|---|
| RD | 71 | 85 | 100 | 118 | 141 | 165 | 195 |
| WR | 65 | 77 | 89 | 102 | 102 | 134 | 153 |

706, 709, 711

720 — SCALED CONSTANT OFFSETS

```
         BINS = [1    2    3    4    5    6    7    8    9    10];
READ CONSTANT OFFSET  = [2.45 2.45 2.45 2.45 2.45 2.45 2.45 2.45 2.45 2.45];
WRITE CONSTANT OFFSET = [9.8  9.8  9.8  9.8  9.8  9.8  9.8  9.8  9.8  9.8];
```

730 — PERFORMANCE LEVEL BY SCALING CONSTANT OFFSET VALUES

| QUEUE | 1 | 2 | 4 | 8 | 16 | 32 | 64 |
|---|---|---|---|---|---|---|---|
| RD | 73 | 87 | 102 | 120 | 140 | 164 | 190 |
| WR | 66 | 78 | 91 | 104 | 118 | 133 | 150 |

CHANGING THE PERFORMANCE LEVEL OF A DISK DRIVE

BACKGROUND

Today, computing devices such as personal computers, laptop computers, personal digital assistants, mobile devices, tablets, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive and/or accesses data that is stored somewhere by a disk drive. A huge market exists for disk drives for computing devices such as server computers, desktop computers, laptop computers, mobile computers, mobile devices, etc.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track. Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel.

To be competitive in the disk drive market, a disk drive should be relatively inexpensive and should embody a design that is adaptive for low-cost mass production, while at the same time provide high data storage capacity and provide rapid access to data. Satisfying these competing restraints of low-cost, high data storage capacity, rapid access to data and improved reliability requires innovation in each of the numerous components of the disk drive, methods of assembly, and in testing.

A wide variety of different types of disk drives having different numbers of heads and disks, and different amounts of storage capacity, are manufactured and provided to disk drive purchasers to satisfy their storage needs. It is important to maintain targeted seek time performance levels for each type of disk drive manufactured to satisfy the needs of the disk drive purchasers.

Unfortunately, each type of disk drive having a particular storage capacity and a particular number of heads and disks presently requires optimized tunings to meet the targeted seek time performance levels to satisfy the disk drive purchaser's requests. This significantly increases the amount of work load and costs to disk drive manufacturers to manufacture these different types of disk drives.

BRIEF SUMMARY OF THE INVENTION

In an embodiment, a method or apparatus for changing a performance level of a disk drive from an initial performance level to a target performance level, wherein the disk drive includes a profile table. In an embodiment, the method including determining an initial performance level, determining a target performance level, determining constant offset values that cause the performance level of the disk drive to match the target performance level, and programming a constant offset table of the profile table with the constant offset values.

BRIEF DESCRIPTION OF THE DRAWINGS

FIG. 7 shows a plurality of tables illustrating performance levels and constant offsets, according to one embodiment of the invention.

DETAILED DESCRIPTION

Figure 1:
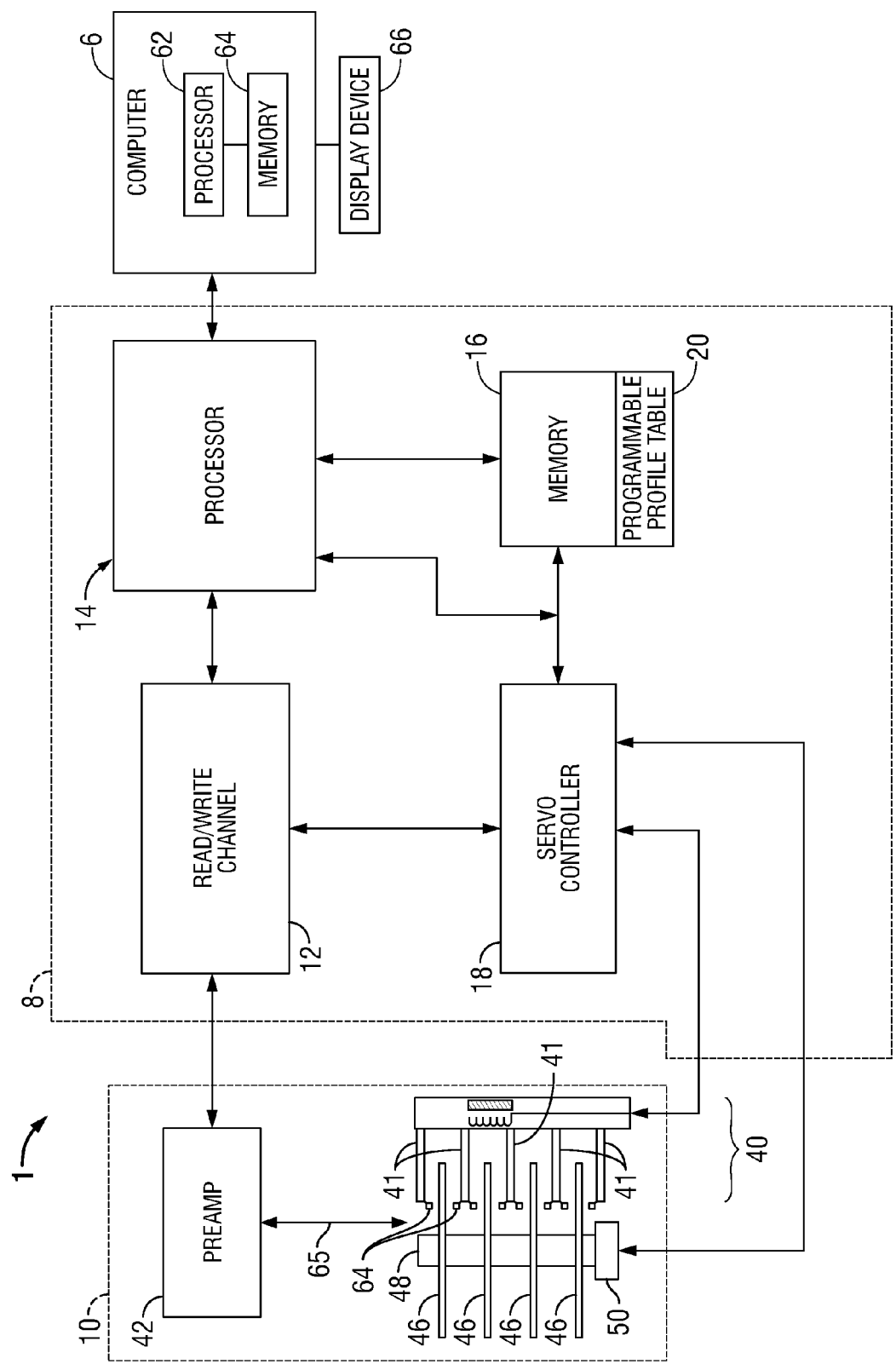
FIG. 1 shows a simplified diagram of components of a disk drive coupled to a computer, according to one embodiment of the invention.

With reference to FIG. 1, FIG. 1 shows a simplified block diagram of components of disk drive 1 coupled to a computer 6. Disk drive 1 may include control circuitry 8 that may be implemented in a printed circuit board assembly (PCBA) and a head disk assembly (HDA) 10. Control circuitry 8 may be coupled to a computer 6, as will be described in more detail.

HDA 10 may comprise: a plurality of disks 46 for data storage; a spindle motor 50 for rapidly spinning each disk 46 on a spindle 48; and an actuator assembly 40 including a voice coil motor (VCM) for moving the plurality of actuator arms 41 and heads 64 over disks 46. The heads 64 may be connected to a preamplifier 42 via a cable assembly 65 for reading and writing data to and from disks 46. Preamplifier 42 may be connected to read/write channel circuitry in control circuitry 8. Each of the disks 46 may have a plurality of tracks defined by a plurality of embedded servo sectors. Each servo sector may include head positioning information such as a track address for course positioning during seeks and servo bursts for fine positioning while tracking the centerline of a target track during write/read operations. Further, each of the tracks may include data sectors between each of the servo sectors.

Control circuitry 8 may comprise a read/write channel 12, a processor 14, a memory 16, and a servo controller 18. Operations for reading and writing data for disk drive 1 may be executed under the control of processor 14 connected to the read/write channel 12, servo controller 18, and memory 16. These operations may be implemented for a host computer during normal disk drive operation or for computer 6 during testing. For example, program code executed by processor 14 may be stored in non-volatile memory and random access memory (RAM) 16. Program overlay code stored on reserved tracks of disks may also be loaded into memory 16 as required for execution.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10. Control circuitry 8 may process a read signal emanating from a head 64 to demodulate the servo sectors into a position error signal (PES). The PES is filtered with a suitable compensation filter to generate a control signal applied to the VCM which rotates an actuator arm 41 of the actuator assembly 40 about a pivot in a direction that reduces the PES. Further, processor 14 may operate as a disk controller for formatting and providing error detection and correction of disk data, a host interface controller for responding to commands from computer 6, and a buffer controller for storing data which is transferred between disk 46 and computer 6.

Servo controller 18 provides an interface between processor 14 and HDA 10. Processor 14 may command logic in servo controller 18 to position actuator arms 41 and heads 64 using the VCM driver of the actuator assembly 40 and to precisely control the rotation of a spindle motor to spin the disks 46. Disk drive 1 may employ a sampled servo system in which equally spaced servo sectors are recorded on each track of each disk. Data sectors may be recorded in the intervals between the servo sectors on each track. Servo sectors may be sampled at regular intervals by servo controller 18 to provide servo position information to processor 14. Servo sectors may be received by read/write channel 12 and are processed by servo controller 18 to provide position information to processor 14. It should be appreciated that this is a simplified description of a disk drive 1 and that many different types of disk drive implementations may be implemented in accordance with embodiments of the invention.

According to one embodiment of the invention, memory 16 may include a programmable profile table 20. Programmable profile table 20 may be utilized in conjunction with servo controller 18 for seek operations in order to read and write data to and from disks 46. Programmable profile table 20 may be viewed as an entity that describes expected seek times for a given seek length. Programmable profile table 20 may be utilized by servo controller 18 to assist in rotational position optimization (RPO) as well as just-in-time seeking (JITS) strategies. As an example, programmable profile table 20 may be used to assist in RPO techniques to calculate the closest target among many available targets and may be utilized by JITS techniques to calculate the available latency. In order to optimize disk drive performance against environmental and drive-to-drive variations, disk drive 1 may implement adaptive seek profiles by utilizing programmable profile table 20.

Figure 2:
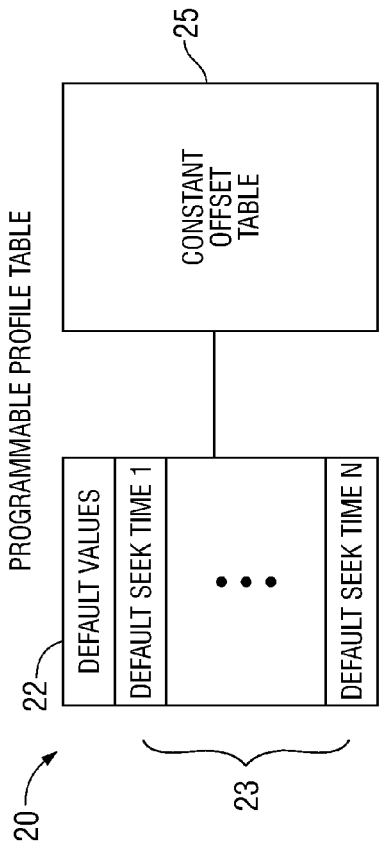
FIG. 2 shows a simplified diagram of a programmable profile table, according to one embodiment of the invention

With additional reference to FIG. 2, programmable profile table 20 may include default values 22 that include a plurality of expected seek times (1-N) 23, as well as, a constant offset table 25. By utilizing the values of programmable profile table 20 in association with servo controller 18, the programmable profile table 20 provides an adaptive mechanism that follows the behavior of the disk drive and assists servo controller 18 in seek operations. As an example, three main components may be utilized to calculate an expected seek time for a given seek length. In particular, an expected seek time may be based on a default value 22, a value from a constant offset table 25, and an adaptive value. Thus, as one example, expected seek time=default value+constant offset value+adaptive value.

As to default values 22, the default values (1-N) 23 are values that are determined during disk drive development and reflect the expected seek time for a given seek length. Thus, default expected seek times 1-N 23 may include hundreds of different values in the programmable profile table 20 and default values 22 have fairly high resolution.

Figure 3:
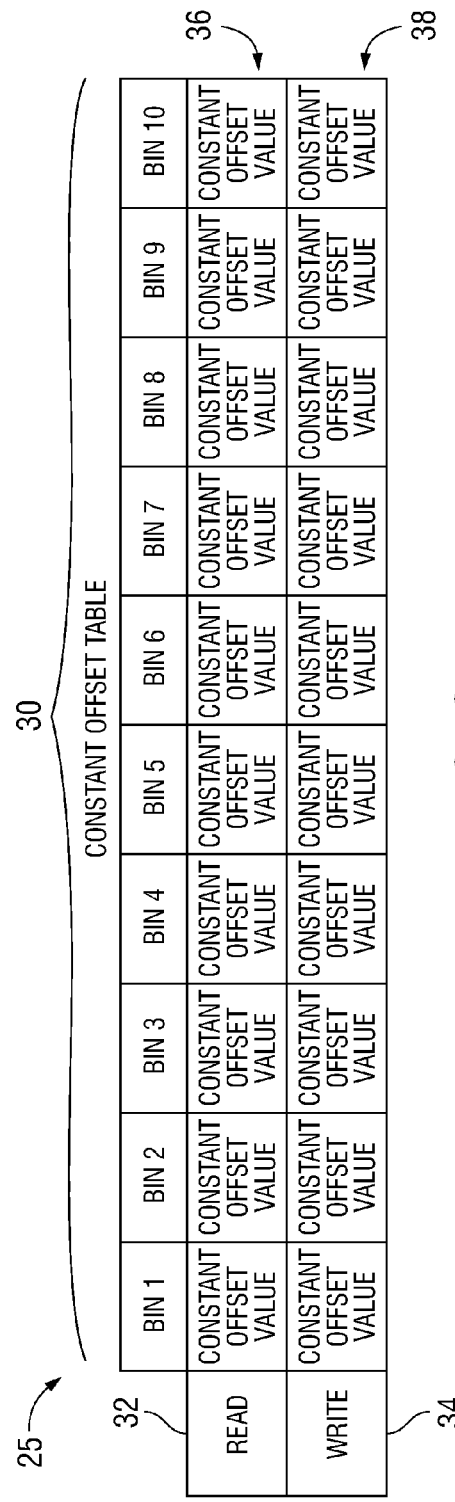
FIG. 3 shows a simplified diagram of the components of a constant offset table, according to one embodiment of the invention.

Constant offset table 25 includes constant offset values that are also determined during disk drive development. The constant offset value is greater than 0 and nominally mimics the variation of a given zone or bin. As is well known in the disk drive field, the area of a disk may divided radially inward from the outer diameter (OD) to the inner (ID) into a plurality of different bins or zones. In this example, the disk has been divided into 10 bins, as will be described. With brief additional reference to FIG. 3, as one example, constant offset table 25 may include ten bins 30 (e.g., bin 1 . . . bin 10) and, for each read operation 32 or write operation 34, the constant offset table 25 stores a constant offset value 36 or 38, respectively. In particular, the constant offset values 36 and 38 of the constant offset table 25 may be used to capture the variability of seek length based upon the bin in which it takes place.

Adaptive values may be utilized in calculating expected seek times and may simply track the mean of the seek time based upon observations. In one embodiment, the adaptive value is ideally zero, if all seeks in a given bin or zone reach the target at the expected time. However, if seeks are typically arriving late, then the adaptive value may be a positive number, and if the seeks are typically arriving early, then the adaptive value may be a negative number. Thus, the adaptive value is real time feedback. Therefore, a seek time may be based upon values from programmable profile table 20 including: a default value (based on length)+a constant offset value (based upon bin)+an adaptive value.

In one embodiment of the invention, computer 6 may be used to change the performance level of disk drive 1 from an initial performance level to a target performance level. Computer 6 under the control of a processor 62 may be used to execute operations comprising: determining an initial performance level for the disk drive; determining a target performance level desired for the disk drive; determining constant offset values 36 and 38 that cause the performance level of the disk drive to match the target performance level; and programming the constant offset table 25 of the programmable profiled table 20 stored in the memory 16 of the disk drive 1 with the constant offset values 36 and 38. It is noted that in some embodiments a first computer may perform these activities described above except the programming of the table 25, and a different, second computer/device may perform the programming of the table 25.

As an example, computer 6 may include a processor 62 to execute instructions stored in memory 64 to perform the operations described herein. Further, computer 6 may include a display device 66 to assist test personnel in performing testing procedures. Computer 6 may be any suitable type of computing device, such as, a desktop computer, laptop computer, mobile computer, mobile device, etc. It should be appreciated that computer 6 may operate under the control of a program, firmware, or routine to execute methods or processes in accordance with the embodiments of the invention.

A particular example of utilizing computer 6 to change a performance level of disk drive 1 from an initial performance level to a target performance level will be hereinafter described. In order to understand embodiments of the invention it should be appreciated that a disk drive manufacturer may produce a number of different disk drives having different numbers of heads, different physical storage capabilities, and different usable storage capacities.

Figures 4, 5:
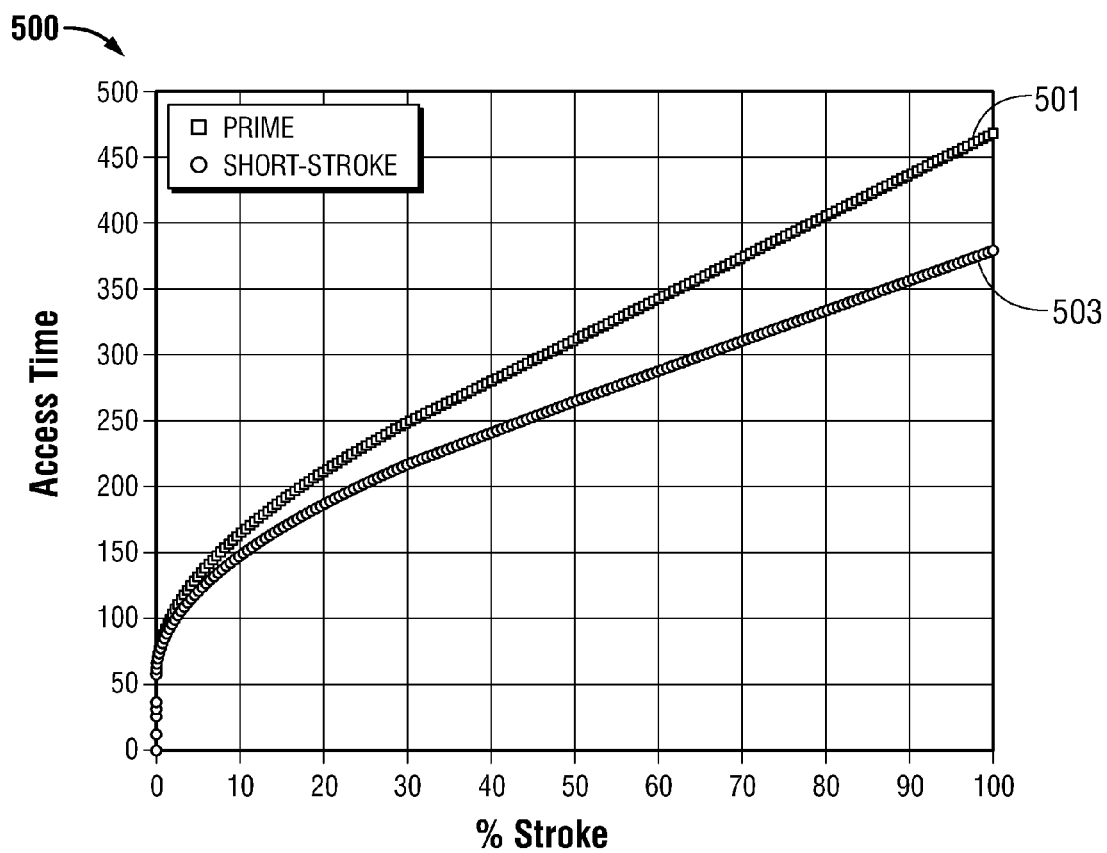
FIG. 4 shows a diagram of an example of a class of disk drives that have: different numbers of heads, different storage capabilities, and different desired storage capacities, according to one embodiment of the invention.
FIG. 5 is a graph that illustrates access times versus percentage of stroke, according to one embodiment of the invention.

FIG. 4 illustrates an example in which a class of disk drives is manufactured that has: different numbers of actual/useable heads 402, different physical storage capabilities 404, and different usable storage capacities 406. Some of these disk drives may be denoted as "prime" disk drives 410 where as other disk drives may be denoted as "short-stroked" disk drives 412.

The distinctions between "prime" and "short-stroked" are as follows. In prime drives, the usable storage capacity matches the physical storage capability. For example, one prime drive 410 has five heads and a physical capability and usable capacity of 2 TB while another prime drive 410 has ten heads and a physical capability and usable capacity of 4 TB. In short-stroked drives, the usable storage capacity is below the physical storage capability, due to a process called "waterfalling" in which some drives originally designed for higher capacity are discovered with slight defects which cause them to be re-configured and shipped as lower capacity drives. This occurs because some of the physical heads are not deemed to be fit for use after the manufacturing process. For example, a drive may be made with 10 heads, but only 7 may ultimately be deemed fit for use. This 7 useable head disk drive would have a physical storage capability of 2.8 TB. However, 2.8 TB falls between common/expected drive capacities of 2 TB and 3 TB, so a waterfalled version of this disk drive may be provided by short-stroking the heads at the outer diameter (OD) to achieve the lower usable storage capacity 406 (2 TB) as expected by disk drive purchasers. Similarly, to reach the usable 3 TB storage capacity 406 expected by disk drive purchasers, 8- or 9-head disk drives may be short-stroked to reach the 3 TB usable capacity.

Short-stroking increases the performance of the drives since the seek ranges of the heads are effectively reduced. Even though these short-stroked drives have faster seek performance than their prime counterparts, in certain situations this increased performance is undesirable. For example, some purchasers may prefer uniformity of performance for drives at a given capacity regardless of whether the drives are prime or short-stroked. Also, from a user-expectation standpoint it may be problematic that drives with the same listed/advertised capacities have different performance. Therefore, according to embodiments of the invention, the performance level of these short-stroked disk drives 412 may be reduced to match the performance level of the associated prime drive 410.

To illustrate this, with additional brief reference to FIG. 5, a graph is shown illustrating access or seek times (e.g., in milliseconds) along the Y-axis versus the percentage of stroke along the X-axis. As a particular example, line 501 shows the access time vs. the percentage of stroke for a 2 TB prime drive with five heads (411) as opposed to line 503 which shows the access time vs. the percentage of stroke for a 2.8 TB data storage capability short-stroked drive having 7 heads (413). As can be seen the short-stroked disk drive 413 (line 503) operates with much faster access time as opposed to the prime disk drive 411 (line 501). Embodiments of the invention relate to making the access or seek time 503 of the short-stroked drive 413 comparable to the access or seek time 501 of the prime disk drive 411.

In one embodiment of the invention, in order to accomplish this, the constant offset values 36 and 38 of the constant offset table 30 of the programmable profile table 20 (e.g., in memory 16 of the disk drive 1) may be programmed by the computer 6 such that a short-stroked disk drive is programmed to mimic and have approximately the same seek times as an associated prime disk drive. Thus, as an example, the seek time values 503 of the short-stroked disk drive 413 may be increased such that it approximately matches the seek times 501 of the prime disk drive 411.

Figure 6:
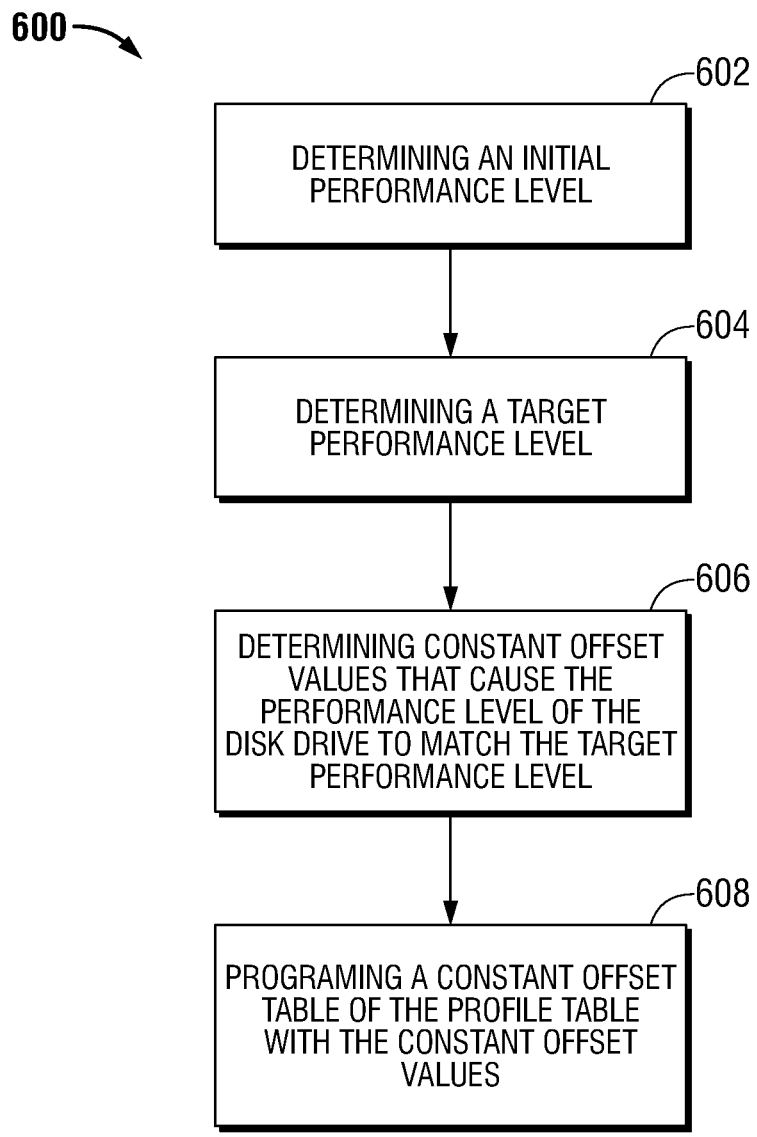
FIG. 6 is a flow diagram illustrating operations performed by the computer, according to one embodiment of the invention.

As shown with additional reference to FIG. 6, in order to accomplish this, computer 6 may execute operations 600 comprising: determining an initial performance level 503 for the short-stroked disk drive 413 (block 602) and determining a target performance level 501 for the prime disk drive 411 to be emulated (block 604). Next, computer 6 may execute an operation including determining constant offset values 36 and 38 that cause the performance level 503 of the short-stroked disk drive 413 to approximately match the target performance level 501 (block 606). Thus, in this example the seek performance level 503 of the short-stroked disk drive 413 may be modified to approximately match the target performance seek level 501 of the prime disk drive 411. Once the constant offset values 36 and 38 are determined by the computer 6, the computer 6 may execute an operation including programming the constant offset table 25 of the programmable profile table 20 (e.g., stored in memory 16 of the disk drive) with the constant offset values 36 and 38 such that the short-stroked disk drive operates with similar seek time and with similar data storage capacity as the associated prime disk drive (block 608). As noted above, in one embodiment, block 608 may be performed by a different computer/device at a manufacturing facility.

It should be noted the matching of the initial performance level 503 to the target performance level 501 is accomplished without individually tuning the short-stroked disk drive 413, but rather by having the computer 6 perform offline calculations to determine adjusted constant offset values 36 and 38. Then the computer 6 or another computer/device may program the constant offset table 25 in the disk drive 1 with the determined constant offset values 36 and 38. This results in significant cost, time, and work-load savings in the manufacturing of short-stroked disk drives.

With additional reference to FIG. 7, an example of determining constant offset values 36 and 38 that cause the performance level of the short-stroked disk drive 413 to match the performance level of the prime disk drive 411 will be described.

As shown in table 702, computer 6 may determine the initial constant offsets for the short-stroked disk drive 413. In this example bins 1-10 have read constant offset values of 2 and write constant offset values of 8 already stored in the constant offset table 25 of the programmable profile table 20. Computer 6 may determine an initial performance level 704, which is listed by queue-depth of the various queues 706. Each listed queue-depth listing (1, 2, 4, 8, etc.) includes a value that refers to the amount of commands (the actual queue-depth) and associated input/output (I/O) reads per second 708 and associated I/O writes per second 710.

The desired target performance level (table 705) is calculated by simply dropping the initial performance level 704 by a certain percentage (15% in the example shown) such that the I/O reads per second and I/O writes per second values 708 and 710 are dropped by approximately the same percentage to arrive at the values 709 and 711. Note that this desired level matches the level of a counterpart prime drive.

In order to accomplish this desired target performance level (table 705), the computer 6 may scale the initial constant offset values 702 by a coefficient. As an example if a coefficient value 1.225 is used for scaling, then the scaled constant offset values are created (shown by table 720) in which the read constant offset values are increased to 2.45 and the write constant offset values are increased to 9.8 for all of the bins 1-10. It should be appreciated that these values may be rounded to make fixed point implementation possible and that these values are only used as examples. Based upon the increased scaled constant offset values (table 720), computer 6 may then test the performance level of the short-stroked disk drive 413. These test results are shown in table 730 (performance level by scaling constant offset values), in which the I/O reads per second 731 and I/O writes per second 733 are very similar to the desired target performance level data shown in table 705. It has been found that by scaling the constant offset table by a coefficient resulting in increased constant offset values that a desired target performance level can be achieved.

Based upon this, computer 6 may program the constant offset table 25 of programmable profile table 20 of the short-stroked disk drive 413 with the newly determined constant offset values 720. In this way, the constant offset table 25 of the short-stroked disk drive 413 may be programmed with the increased constant offset values 720. This results in the seek times being increased to decrease the performance time of the short-stroked disk drive 413 such that it approximately matches the target performance level associated with the prime disk-drive 411. This has been found to be beneficial in that the short-stroked disk drive 413 is simply programmed by the computer 6 with new constant offset values in its constant offset table 25 and no special tuning is required. This results in significant cost, time, and work-load savings in the manufacturing of short-stroked disk drives.

The above described embodiments provide many benefits in that short-stroked disk drives can easily have their performance times decreased to match associated prime disk drives' performance through offline testing and by programming a constant offset table of a programmable profile table stored in the memory of the disk drive itself. Without these techniques, short-stroked disk drives may need to be optimized through tuning techniques which significantly increases manufacturing workload and costs.

Further, it should be appreciated that embodiments of the invention may relate to various types of disk drives having various numbers of heads and disks, storage capability, and desired storage capacity and that the previously described prime and short-stroked disk drives are just examples. Additionally, although the constant offset table has been shown including 10 bins, it should be appreciated that any suitable number of bins may be utilized for determining associated constant offset values. Also, as an example, all of the previously-described original constant offset values and calculated constant offset values utilized the same numbers for the bins, however, it should be appreciated that differing constant offset values for the bins may be utilized or calculated. Accordingly, various values have been utilized to illustrate aspects of the invention, however many different types of values and calculations may be utilized.

It should be appreciated that embodiments of the invention may be implemented by operations performed by a computer in communication with a disk drive and may operate under the control of a program, firmware, or routine to execute methods or processes in accordance with the previously described embodiments of the invention.

For purposes of the present specification, it should be appreciated that the terms "processor," "controller," etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously may be employed by a computer for changing the performance level of a disk drive. However, other types of data storage devices with similar or other media format characteristics similar to disk drives may be tested by a computer to use the invention with equal advantage to implement these techniques.

What is claimed is:

1. A method for changing a performance level of a disk drive from an initial performance level to a target performance level, wherein the disk drive includes a profile table, the method comprising:
   determining an initial performance level;
   determining a target performance level;
   determining constant offset values that cause the performance level of the disk drive to match the target performance level; and
   programming a constant offset table of the profile table with the constant offset values,
   wherein determining the constant offset values includes scaling the constant offset table by a coefficient, and wherein scaling the constant offset table by the coefficient includes increasing constant offset values of the constant offset table such that access times are increased.

2. The method of claim 1, wherein the constant offset values are associated with bins.

3. The method of claim 1, wherein the constant offset values are associated with read operations and write operations.

4. The method of claim 1, wherein the disk drive is a short-stroked disk drive and the constant offset table is programmed with the increased constant offset values such that access times are increased to decrease performance time of the short-stroked disk drive.

5. The method of claim 4, wherein the short-stroked disk drive includes N heads in operation which is greater than the number of heads in an associated prime disk drive and the access times are increased to decrease the performance time of the short-stroked disk drive to match the performance time of the associated prime disk drive.

6. The method of claim 1, wherein determining the initial performance level and the target performance level includes measuring the number of input/outputs per second for read and write operations based upon a queue amount of commands.

7. A computer to change a performance level of a disk drive from an initial performance level to a target performance level, wherein the disk drive includes a profile table having a constant offset table stored in a memory, the computer comprising:
    a processor configured to control the computer to execute operations comprising:
        determining an initial performance level for the disk drive;
        determining a target performance level for the disk drive; and
        determining constant offset values that cause the performance level of the disk drive to match the target performance level,
        wherein determining the constant offset values includes scaling the constant offset table by a coefficient, and wherein scaling the constant offset table by the coefficient includes increasing constant offset values of the constant offset table such that access times are increased.

8. The computer of claim 7, wherein the computer under the control of the processor further executes an operation comprising programming the constant offset table stored in the memory of the disk drive with the constant offset values.

9. The computer of claim 7, wherein the constant offset values are associated with bins.

10. The computer of claim 7, wherein the constant offset values are associated with read operations and write operations.

11. The computer of claim 7, wherein the disk drive is a short-stroked disk drive and the constant offset table is programmed with the increased constant offset values such that access times are increased to decrease performance time of the short-stroked disk drive.

12. The computer of claim 11, wherein the short-stroked disk drive includes N heads in operation which is greater than the number of heads in an associated prime disk drive and the access times are increased to decrease the performance time of the short-stroked disk drive to match the performance time of the associated prime disk drive.

13. The computer of claim 7, wherein determining the initial performance level and the target performance level includes measuring the number of input/outputs per second for read and write operations based upon a queue amount of commands.

14. A method for changing a performance level of a disk drive from an initial performance level to a target performance level, wherein the disk drive includes a profile table, the method comprising:
    determining an initial performance level;
    determining a target performance level;
    determining constant offset values that cause the performance level of the disk drive to match the target performance level; and
    programming a constant offset table of the profile table with the constant offset values, wherein determining the constant offset values includes scaling the constant offset table by a coefficient, and wherein scaling the constant offset table by the coefficient includes modifying constant offset values of the constant offset table such that access times are increased.

15. A method for changing a performance level of a disk drive from an initial performance level to a target performance level, wherein the disk drive includes a profile table, the method comprising:
    determining an initial performance level;
    determining a target performance level;
    determining constant offset values that cause the performance level of the disk drive to match the target performance level; and
    programming a constant offset table of the profile table with the constant offset values,
    wherein determining the constant offset values that cause the performance level of the disk drive to match the target performance level is performed offline by offline calculations, and wherein the constant offset table is programmed with the constant offset values offline such that the disk drive does not require tuning.

16. A computer to change a performance level of a disk drive from an initial performance level to a target performance level, wherein the disk drive includes a profile table having a constant offset table stored in a memory, the computer comprising:
    a processor configured to control the computer to execute operations comprising:
        determining an initial performance level for the disk drive;
        determining a target performance level for the disk drive; and
        determining constant offset values that cause the performance level of the disk drive to match the target performance level,
        wherein determining the constant offset values that cause the performance level of the disk drive to match the target performance level is performed offline by offline calculations, and wherein the constant offset table of the disk drive is programmed by the computer with the constant offset values such that the disk drive does not require tuning.

\* \* \* \* \*